June 12, 1928.
I. HOCHSTEIN
1,673,454
CLAMPING DEVICE
Filed Feb. 8, 1927
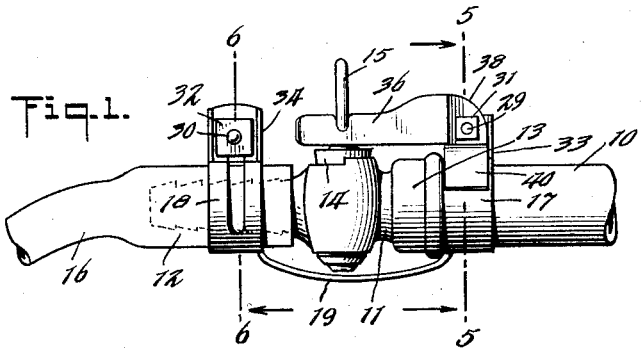
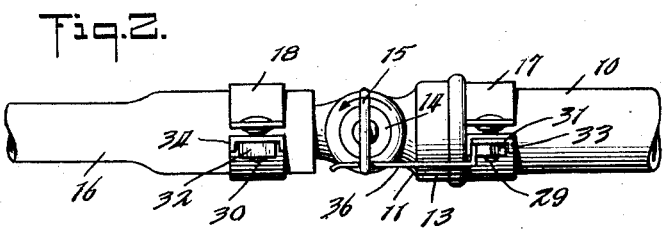
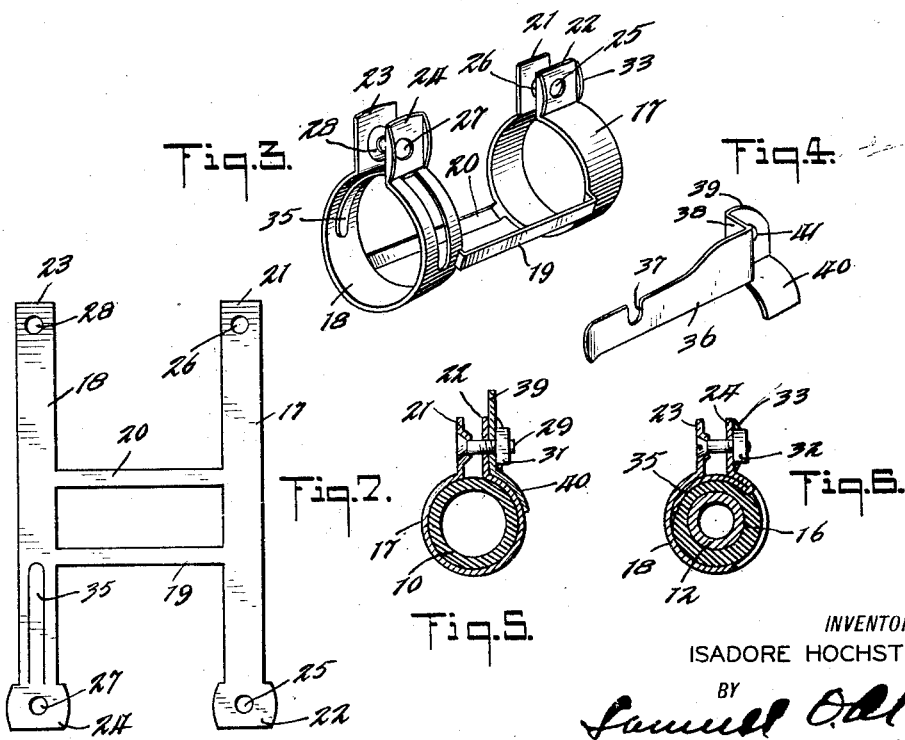
INVENTOR
ISADORE HOCHSTEIN
BY
ATTORNEY Patented June 12, 1928.

1,673,454

UNITED STATES PATENT OFFICE.

ISADORE HOCHSTEIN, OF BROOKLYN, NEW YORK.

CLAMPING DEVICE.

Application filed February 8, 1927. Serial No. 166,761.

My invention relates to safety devices, and more particularly to safety couplings or clamps, by means of which a tubing, such as a rubber tubing, may be securely held in operative connection with a metallic or other tubing such as, for instance, the usual cock or connection for gas stoves or the like.

Still more particularly my invention relates to a safety coupling or clamp of this character, which may be caused to engage any usual gas supply pipe with one end, and with the other engage a rubber tubing, or other tubing, detachably connected to the gas supply pipe and, to so grip the tubing that the detachable tubing may not be accidentally detached from the tube or supply pipe to which it is connected.

Still further my safety clamp or coupling is provided with means arranged to engage a key or controlling element embodied in the gas supply pipe, so that it will automatically lock the key or controlling element in closed position and thereby prevent the accidental and unintended opening or movement of the key or controlling element and so that the movement or opening of the key or controlling element can take place only after and as the result of a deliberate and positive action by the operator.

My clamp is so constructed and combined that one clamping element engages the pipe or tubing to which a hose is to be attached and another clamp element engages and holds thereon a tubing to be attached thereto, yet these clamping elements are so connected by straps or bars that the entire clamp is a unit, of substantially one-piece construction. And further, my clamp beside providing an adjustability to each of the clamping elements is also provided with a means by which a key or valve in the supply pipe may be securely locked and held in locked position against unintended movement in such a manner that movement of the key or valve can take place only after the unlocking thereof from my locking element and only after a positive operation by the operator.

By the provision of the means incorporated in my safety clamp I am able to effect a junction of a flexible gas pipe with a gas fitting so that they may not be accidentally separated and so that in the event of the provision in said fitting of a key or control valve that said key or control valve may not be accidentally opened, but may be operated only by the positive action of the operator and will be automatically locked against such accidental opening when the key or control valve is turned to closed position.

My invention consists of the particular combination, organization and arrangement of parts shown in the accompanying drawings, described in the specification, and more specifically defined in the appended claims.

One of the objects of my invention is, to provide a device of this character which will securely clamp a hose or flexible tube to a gas supply pipe or fitting so that accidental displacement of the hose or tube may not be effected.

Another object is to provide a safety clamp of this character which may be readily attached to a gas supply pipe or fitting and a hose or flexible tube carried thereon or connected thereto so that the hose and pipe may be securely held together against accidental detachment, and so that the clamp may be readily detached therefrom when desired.

Another object is to provide a device of this character which will not only hold a hose or tube in attached relation to a gas supply pipe but which by means provided in my clamping device will automatically lock a key or control valve in closed position and which will necessitate a positive action on the part of the operator to position the key or control valve so that a flow of gas may be permitted through the supply pipe to the tube.

Another object is to provide a clamp having a plurality of clamping elements connected by straps or other like means so that the clamping elements are so joined that the entire clamping device is a unit, the parts of which are so related that the clamps may not readily accidentally be unclamped from its clamping position and which will not readily permit the detachment of the tubular member from the gas supply pipe except by the deliberate detachment of the clamping elements from the gas supply pipe or from the tube.

In the drawings:

Fig. 1 is a side elevation showing a section of a gas supply pipe, a hose cock attached thereto and a section of flexible tubing mounted on said hose cock nozzle illustrating my clamping device mounted in operative relation to the gas supply pipe and hose, and illustrating the key locked in closed position.

Fig. 2 is a top plan view of the arrangement of my device shown in Fig. 1.

Fig. 3 is a perspective view of my clamping unit showing its construction but with the locking bolts and the locking finger removed therefrom.

Fig. 4 is a perspective view of the locking finger of my safety clamp device, detached from the clamping elements, illustrating its peculiar formation.

Fig. 5 is a vertical cross-sectional view taken on line 5—5 of Fig. 1 looking in the direction of the arrow, showing one end of my clamping element as clamped around the gas supply pipe, it being that end to which I have illustrated the locking finger to be attached.

Fig. 6 is a vertical cross-sectional view taken on line 6—6 of Fig. 1, showing the opposite end of my clamping element clamped around the connected flexible tube and holding said tube connected to the nozzle of the hose cock, it being the end opposite that carrying the locking spring finger which was illustrated in Fig. 4.

Fig. 7 is a plan view of the blank from which my unitary clamp comprising the clamp ends and the straps or bars connecting said ends together is formed.

Referring to the drawings, in which like numerals of reference indicate corresponding parts, a gas supply pipe 10, which in this instance is such as is generally provided for gas distribution, has connected thereto a hose cock 11. The hose cock 11 has a nozzle portion 12 and a head 13 on its opposite end for attachment of the hose cock to the gas supply pipe. The hose cock 11 is likewise provided with the usual control valve or key 14, for the purpose of permitting or preventing the flow of gas or other substance through the supply pipe and hose cock. The valve or key 14 is provided with a handle or key head 15 of any usual pattern by means of which the key 14 may be operated and by means of which, by a portion of my device, the key may be held in locked or closed position. Attached to the nozzle 12 of the hose cock 11 is a tube 16 of any usual kind, for instance, such as that which may be used to feed any ordinary type of gas stove with its gas supply.

My safety clamp is provided at one end with a clamping element 17 which is shown as clamped around the gas supply pipe 10 and at its other end is provided with a clamping element 18 which is shown as clamped around the flexible tube 16. The clamping elements 17 and 18 are held in fixed relation to each other by straps or bars 19 and 20 which are preferably integral with the clamping elements 17 and 18, and which with these clamping elements forms a clamping device of unitary construction. The clamping element 17 is a split ring provided with outwardly bent tongue-like portions 21 and 22, while the clamping element 18 is also a split ring and is provided with tongue-like portions 23 and 24. The tongue-like elements 21, 22, 23 and 24 are provided with openings 25, 26, 27 and 28 adapted to receive bolts 29 and 30 by means of which the clamping elements 17 and 18 may be tightly and securely locked in clamping position around the gas supply pipe 10 and the flexible tube 16, and by means of which the clamping elements may be adjustably held to the gas supply pipe and flexible tube or may be permitted to be detached therefrom. It will be noticed from Fig. 1 that the straps or connecting bars 19 and 20 are given a somewhat curved formation in order to be out of contact with the control valve or key 15. This, however, is an arbitrary feature of design and I do not wish it to be understood as a necessary part of my invention, for the bars 19 and 20 may be formed as shown in Fig. 3 and so placed around the periphery of the clamping elements 17 and 18 as to be out of contact with the valve portion of the hose cock 11. A feature of my invention, however, is that the clamping elements 17 and 18 shall be joined by straps or bars that will hold them in fixed relation to each other, such as, for instance, the bars 19 and 20.

In order that the nuts 31 and 32 may be conveniently held against rotation when the bolts 29 and 30 are turned, I provide on the tongues 22 and 24 flanges 33 and 34, which will engage the edges of the nuts and hold them against any tendency to turn. By this means I may conveniently tighten or loosen the bolts by any suitable instrument such as a screw-driver which will engage a slot provided in the bolt-head, as illustrated in Fig. 6.

It will be seen from Fig. 1 that when I have firmly clamped the clamp element 17 around the gas supply pipe 10 and have firmly clamped the clamp element 18 around the connected tube 16 the flexible tube and supply pipe will be securely held in fixed operative relation and the clamping elements 17 and 18 will be held securely in fixed relation to each other and to the gas supply pipe 10 and the flexible tube 16. This relation of the clamping elements is maintained by the connecting straps or bars 19 and 20 illustrated in Fig. 3 and the whole device thereby prevented from accidental displacement from the gas pipe 10 and the flexible tube 16, and may not be detached therefrom except by the positive action of an operator in removing the bolts 30 and 29.

It will be observed that the clamping element 17 is substantially a solid band split ring having the tongue elements 21 and 22, while the clamping element 18 is provided with a tongue portion 35 formed from and inwardly bent from the body portion of the clamping element 18. This tongue 35 is so formed that it spans the space between the tongue portions 23 and 24 of the clamping element 18 in such a manner that when the clamping element 18 is clamped upon the flexible tube 16, the clamping surface bearing upon the tube 16 will present a completely circular area, engaging the surface of the tube throughout its entire circumference and will thereby prevent any buckling or bulging that might otherwise permit a leakage as the results thereof.

I not only by my device provide means which will securely clamp a hose to a supply pipe and hold it against accidental displacement but in combination therewith I provide means which will also automatically lock a control key against accidental opening but which will permit the ready opening of said control key upon positive and intended action of the operator.

The means provided to effect this automatic locking of the control key 15 I preferably attach to the clamping element 17. This means comprises a main tongue-like leaf spring 36 provided with a slot 37, the tongue-like portion having a laterally extending portion 38 at one end and a rearwardly and downwardly extending portion 39 angularly disposed to the laterally extending portion 38; the laterally extending portion 39 being provided at its lower end with a downwardly and laterally extending portion 40 of curved formation substantially corresponding in curvature to the formation of the outer periphery of that section of the clamping element 17 adjacent to tongue portion 21. The angularly laterally extending portion 39 is provided with an opening 41 adapted to receive the bolt 29 therein and to thereby permit the mounting of the locking means thereon in combination with my clamping elements. In order to hold the locking means in operative relation, I tighten on the bolt 29 until the nut 31 firmly grips the portion 39 of the locking means. The downwardly extending curved portion 40 will then rest and be securely held upon and against the clamping element 17 and the upward or downward displacement of the locking means will thereby be prevented, and at the same time the leaf spring 36 thereof will be so positioned that it will extend from the clamping element 17 to the key head 15 and will engage the key head 15 in such a manner that the key head 15 will register in the slot 37 as is illustrated in Figs. 1 and 2.

The locking means is preferably made of spring metal or other suitable material having the desired degree of springy flexibility. This is desirable in order that the leaf spring 36 of the locking means may be slightly displaced when the key head 15 is to be or is being turned to close the valve controlled thereby and so that as the turning action of the key head 15 takes place the leaf spring 36 will bear against the edge of the key head 15 and, when the key is completely closed will automatically cause the key head to be engaged by the slotted portion 37 of the leaf spring 36 and be gripped thereby and held in locked position. It is also desirable that the leaf spring 36 be of springy flexibility in order that when it is desired to unlock the key head 15 in order that it may be turned the operator may readily displace the leaf spring from contact with the key head 15 and thereby permit the key to be turned, but because of the springy flexibility of the leaf spring 36 it will when released from the control of the operator return automatically to its original position ready to re-engage the key head 15 when it is again turned into contact with the leaf spring 36.

Although I have in Figs. 1, 2 and 4 shown a locking element mounted on the clamping element 17; yet it is to be understood that I may as readily provide a locking means that may be mounted on the clamping element 18, if desired.

In order that the method of manufacture of my combined clamp and safety locking device may be readily understood, it will be readily seen by reference to Fig. 7 that I may form the clamping elements and connecting strap pieces as a single unit by stamping them out of any suitable metal or other sheet material having the desired characteristics in the formation shown in that figure, and by then completing the manufacturing by bending or otherwise suitably fashioning the clamp device from this blank into the pattern illustrated in Fig. 3. The locking element may be readily manufactured by being stamped or bent out of any suitable springlike metallic material or other suitable material having the desired characteristics into the formation illustrated in Fig. 4.

The entire device may be assembled into operative relation and mounted upon the junction of the flexible tube with the gas pipe and connected to them after the clamping elements have been put in place, by inserting the bolts 29 and 30 through the openings in the tongues 21, 22, 23 and 24, by mounting the locking element carrying the leaf spring 36 upon one or the other of these bolts and by then tightening the clamp in place by the operation of tightening the bolts 29 and 30, so that the clamps then securely and tightly engage the gas supply pipe 10 and flexible tube 16 attached thereto and so that the slotted leaf spring 36 of the locking element is held in the desired position to grip and securely lock or to permit the unlocking of the key head 15.

It is believed that by the provision of this clamping and locking device I have devised a means by which the accidental disengagement of a flexible tube from the gas supply pipe may be positively prevented, and in combination therewith also provided means by which the control valve carried in a gas supply pipe or extension thereof may be securely locked against accidental opening and may yet at the same time be readily opened by an intended positive action of an operator. By these means it is believed I have provided a device of extremely simple construction of cheap manufacturing cost and of great utility for the purpose for which it was designed and by means of which great safety may be had in the use of gas where the positive coupling of a flexible tube to a gas supply pipe is of essential importance and where the accidental disconnection of the flexible tube from the gas supply pipe might cause loss of life or property, and also means by which the positive control of the key or valve regulating the flow of the fluid or liquid or gas may be so affected that the accidental opening of said valve cannot take place.

Although I have shown and described my invention in great detail, yet I do not wish to be limited thereby, except as the state of the art, and the appended claims may require, for it is obvious that various modifications and changes may be made therein without departing from the spirit and scope of my invention.

What I claim as new, and desire to secure by Letters Patent is:

1. In a clamping device, the combination of a plurality of clamping members, means integral with said clamping members, and holding said members in fixed spaced relation to each other, means to adjustably and detachably clamp said members to members detachable from each other to hold said detachable members in fixed relation, a valve in one of said detachable members and means carried on one of said clamping members to lock said valve in closed position.

2. In a clamping device, the combination of a plurality of clamping members, means integral with said clamping members, and holding said members in fixed spaced relation to each other, means to adjustably and detachably clamp said members to members detachable from each other to hold said detachable members in fixed relation, a valve in one of said detachable members and means carried on one of said clamping members to automatically lock said valve in closed position.

3. In a clamping device, the combination of a plurality of clamping members, means integral with said clamping members, and holding said members in fixed spaced relation to each other, means to adjustably and detachably clamp said members to members detachable from each other to hold said detachable members in fixed relation, a valve in one of said detachable members and spring means carried on one of said clamping members to automatically lock said valve in closed position and adapted to permit said valve to be unlocked and operated to open position.

4. In a clamping device, the combination of a plurality of clamping members, means integral with said clamping members, and holding said members in fixed spaced relation to each other, a tongue inwardly bent from and integral with one of said clamping members, means to adjustably and detachably clamp said members to members detachable from each other to hold said detachable members in fixed relation, a valve in one of said detachable members and spring means carried on one of said clamping members but separable therefrom to automatically lock said valve in closed position and adapted to permit said valve to be unlocked and operated to open position by the operation of said spring means.

5. In a clamping device, the combination of a plurality of split ring clamping elements, a bar integral with each of said clamping elements and holding said elements in fixed spaced relation, bolts engaging tongue portions of said clamping elements adapted to receive said bolts to hold said clamping elements in clamping position upon separably connected members, to hold said members together in connected relation, a spring tongue detachably mounted on one of said clamping elements, a slot in said tongue adapted to engage a valve in one of said separable members to lock said valve automatically in closed position and adapted to be operated to permit said valve to be turned to open position.

6. In a safety device for the junction of a flexible tube to a gas fitting, said fitting having thereon a nozzle to be engaged by the end of said tube, the combination of a clamping member encompassing said end, a means for tightening said member, thereby tightening said end on to said nozzle, another clamping member encompassing a part at said fitting, a leaf spring connected to one of said clamping members, a movable part on said fitting and an opening in said spring for interlocking with said movable part when said fitting is closed.

7. In a safety device for the junction of a flexible tube to a gas fitting, said fitting having thereon a nozzle to be engaged by the end of said tube, the combination of a clamping member encompassing said end, a means for tightening said member, thereby tightening said end on to said nozzle, another clamping member encompassing a part at said fitting, a valve in said fitting and a slotted member carried on one of said clamping members for interlocking with said valve in closed position.

Signed at the city of New York, in the county of New York and State of New York, this 3rd day of February, A. D. 1927.

ISADORE HOCHSTEIN.